United States Patent
Canos et al.

(10) Patent No.: US 7,709,408 B2
(45) Date of Patent: May 4, 2010

(54) CATALYST BASED ON A SOLID MICROPOROUS CRYSTALLINE MATERIAL AND METHOD OF IMPROVING DIESEL FRACTION QUALITY USING SAID CATALYST

(75) Inventors: Avelino Corma Canos, Valencia (ES); Agustin Martinez Feliu, Valencia (ES); Fernando Rey García, Valencia (ES); María José Díaz Cabañas, Valencia (ES); Maria de los Desamparados Arribas Viana, Valencia (ES)

(73) Assignees: Consejo Superior de Investigaciones Cientificas, Madrid (ES); Universidad Politecnica de Valencia, Valencia (ES)

( * ) Notice: Subject to any disclaimer, the term of this patent is extended or adjusted under 35 U.S.C. 154(b) by 1339 days.

(21) Appl. No.: 11/036,783

(22) Filed: Jan. 14, 2005

(65) Prior Publication Data

US 2005/0165267 A1    Jul. 28, 2005

Related U.S. Application Data

(63) Continuation of application No. PCT/ES03/00368, filed on Jul. 15, 2003.

(30) Foreign Application Priority Data

Jul. 16, 2002    (ES)    ................. 200201761

(51) Int. Cl.
*B01J 29/06*    (2006.01)
(52) U.S. Cl. .......................... 502/64; 502/66
(58) Field of Classification Search .................. 502/64, 502/66
See application file for complete search history.

(56) References Cited

U.S. PATENT DOCUMENTS

| | | | |
|---|---|---|---|
| 5,545,788 A * | 8/1996 | Cheng et al. | 585/467 |
| 6,500,329 B2 | 12/2002 | Tsao et al. | |
| 6,849,248 B2 * | 2/2005 | Corma Canos et al. | 423/718 |
| 6,998,037 B2 * | 2/2006 | Corma Canos et al. | 208/120.01 |
| 7,008,612 B2 * | 3/2006 | Corma Canos et al. | 423/718 |
| 7,074,385 B2 * | 7/2006 | Harbuzaru et al. | 423/718 |
| 7,410,924 B2 * | 8/2008 | Corma Canos et al. | 502/64 |

FOREIGN PATENT DOCUMENTS

| | | |
|---|---|---|
| EP | 0 512 652 B2 * | 8/1995 |
| ES | 2192935 | 10/2003 |
| ES | 2 195 744 | 12/2003 |
| WO | WO 02092511 A | 11/2002 |
| WO | WO 03029387 A | 4/2003 |

OTHER PUBLICATIONS

Horvath et al., Method for the Calculation of Effective Pore Size distribution in Molecular Carbon, Journal of Chemical Engineering of Japan, pp. 470-475, 1983, no month available.*

* cited by examiner

*Primary Examiner*—Elizabeth D Wood
(74) *Attorney, Agent, or Firm*—Klauber & Jackson, LLP

(57) ABSTRACT

The invention relates to a catalyst consisting of at least: one matrix comprising at least one oxide which is selected from an amorphous oxide, an oxide with low crystallinity and a mixture of both; at least one solid microporous crystalline material which, in the calcined and anhydrous state, has the molar compositions $X_2O_3:nYO_2:mZO_2$, in which X is a trivalent element such as, for example, Al, B, Fe, In, Ga, Cr, Y is at least one trivalent element that is different from Ge and Z is Ge, the value (n+m) is at least equal to 5 and can be between 5 and ∞, and the value of n/m is at least equal to 1; and at least one hydrogenating compound, preferably Pt, Pd, It, Ru, Rh, and Re or a combination of same. The invention also relates to the use of said catalyst in a process in order to improve the quality of diesel fractions.

20 Claims, 1 Drawing Sheet

CATALYST BASED ON A SOLID MICROPOROUS CRYSTALLINE MATERIAL AND METHOD OF IMPROVING DIESEL FRACTION QUALITY USING SAID CATALYST

This application is a continuation of international application number PCT/ES2003/000368, filed Jul. 15, 2003.

TECHNICAL FIELD

The present invention relates to catalysts based on microporous crystalline materials incorporated into a matrix and to their use for improving the quality of diesel fractions by the reduction of aromatic rings (hydrogenation) and naphthene rings (opening of the ring).

PRIOR ART

One of the major problems currently faced in refineries is that of improving the quality of motor vehicle fuels and reducing the negative impact that some of the compounds present in the combustion gases have on the environment. In the case of diesel fuel (also commonly known as fuel oil), one of the most important parameters that determine its quality, and which is also closely linked to the emission of pollutant particles to the atmosphere during combustion, is the cetane index (and number). A high cetane index (and number) is characteristic of a high quality, environmentally-friendly diesel. The cetane index (and number) of a diesel fuel essentially depends on the nature of the hydrocarbons of which it is composed. Generally, fuel oil is made up of paraffins, naphthenes and aromatics. Paraffins are the hydrocarbons with the highest cetane index (and number), whereas aromatics, in particular polyaromatics, have a lower cetane index (and number). Thus, a high concentration of aromatic hydrocarbons in the diesel results in a low cetane index (and number) and a high level of polluting particulate emissions in the combustion gases. Therefore, in order to obtain a high quality, environmentally-friendly diesel fuel, it will be necessary to minimize the aromatics content and to increase the cetane index (and number) of said diesel.

Currently, in most refineries there are various processes for producing medium distillates, although all of them have major limitations as regards obtaining a high-quality product that can meet the future specifications required for diesel fuels. Of these processes, hydrocracking and hydrogenation are the most important.

In conventional hydrogenation, the aromatics are saturated with naphthenes, with a consequent increase in the cetane index (and number). However, when the fuel oil feed to be treated contains a high concentration of aromatics, as is the case with the fraction known as LCO (Light Cycle Oil) originating from catalytic cracking (FCC) units, the net increase in cetane index (and number) achieved in conventional hydrogenation is low. This is because the naphthenes formed have a relatively low cetane index (and number) in comparison to paraffins and monoalkylcycloalkanes having the same number of carbon atoms. In this case, to increase the cetane index (and number) to the values required by new diesel fuel specifications, it would be desirable, in addition to saturating the aromatics, to also reduce the concentration of naphthene rings by selective opening of the ring, thus increasing the concentration of paraffins and monoalkylcycloalkanes with a higher cetane index (and number). Furthermore, naphthenes, in particular those formed of two or more condensed naphthene rings, have a greater density, resulting in a smaller volume of product in comparison to a medium distillate formed of paraffins and monoalkylcycloalkanes with the same number of carbon atoms.

The other major process for obtaining medium distillates is hydrocracking. Typical hydrocracking catalysts are basically made up of a metal phase with hydrogenating properties supported on acid materials, such as zeolites. Under typical hydrocracking working conditions, these catalysts can be effective for the saturation of aromatics and can also open the naphthene ring, thus reducing the concentration of cyclic structures in the product. However, this opening of the naphthene rings is not selective, but entails a substantial reduction in the molecular weight of the hydrocarbons of the feed, giving rise to the formation of products with a lower boiling point, including gases, that result in a lower yield of medium distillates and, therefore, a loss of the desired product.

In the light of the above, it would be highly desirable to have a process for increasing the cetane index (and number) of low-quality diesel fractions through a combination of the hydrogenation of aromatics, especially polyaromatics, and the selective opening of the naphthene rings present in the feed and/or formed during hydrogenation. Unlike conventional hydrocracking, in this hydrogenation/opening process the opening of the naphthene rings should take place with a minimum production of lower-molecular-weight products by cracking, thus maintaining high yields of medium distillates. The higher the number of molecules with an equivalent number of carbon atoms but with one naphthene ring less than the starting product, the higher the selectivity of opening.

Some patents disclose a process for improving the cetane index (and number) of distillate fractions in the diesel range using a bifunctional catalyst formed of one or more noble metals, preferably Pt, Pd or a combination of both, and an acid zeolite. Thus, U.S. Pat. No. 5,609,752 claims a Pt catalyst supported on zeolite Beta for increasing the cetane index of distillate fractions containing aromatics by means of hydrogenation, or hydrogenation coupled with the opening of naphthene rings (decyclization). According to said patent, zeolite Beta preferably has a high Si/Al ratio, obtained by post-synthesis dealumination, preferably by heat treatments in the presence of steam (steaming). However, the micropore size of zeolite Beta can impose limitations on the diffusion of certain aromatic or naphthene molecules, since neither aromatic nor naphthene molecules with two condensed rings could diffuse in its channel parallel to the c axis (001), whose dimensions are 0.55×0.55 nm.

Patent EP 0 512 652 A1 discloses a process for reducing the number of cyclic structures (hydrodecyclization) present in a fuel oil using a catalyst formed of one or more noble metals (preferably a combination of Pt and Pd) supported on an ultrastable zeolite Y with a high Si/Al ratio in the network (USY). To achieve a high Si/Al ratio in the network, zeolite Y must be subjected to post-synthesis dealumination treatments since this zeolite cannot be synthesized with a high Si/Al ratio. Said dealumination treatments generally require severe hydrothermal conditions resulting in partial destruction of the crystalline structure of the zeolite.

It would therefore be highly desirable to have a catalyst for increasing the cetane index (and number) of low-quality diesel fractions through a combination of hydrogenation of aromatics and opening of the naphthene ring, whose micropore dimensions are greater than zeolite Beta and that, unlike zeolite Y, can be synthesized directly with the appropriate Si/Al ratio without the need for post-synthesis dealumination processes.

The microporous crystalline solid known as ITQ-21 is described in Spanish patent application P200101145. However, its use as a catalyst component for improving diesel fraction quality is neither described nor suggested in said application. Spanish application P20012287, also, relates to said crystalline solid material, specifically to its use in cracking. However, this application does not describe its use as a catalyst component for increasing the cetane index, according to the present invention.

DESCRIPTION OF THE INVENTION

Figure 1:
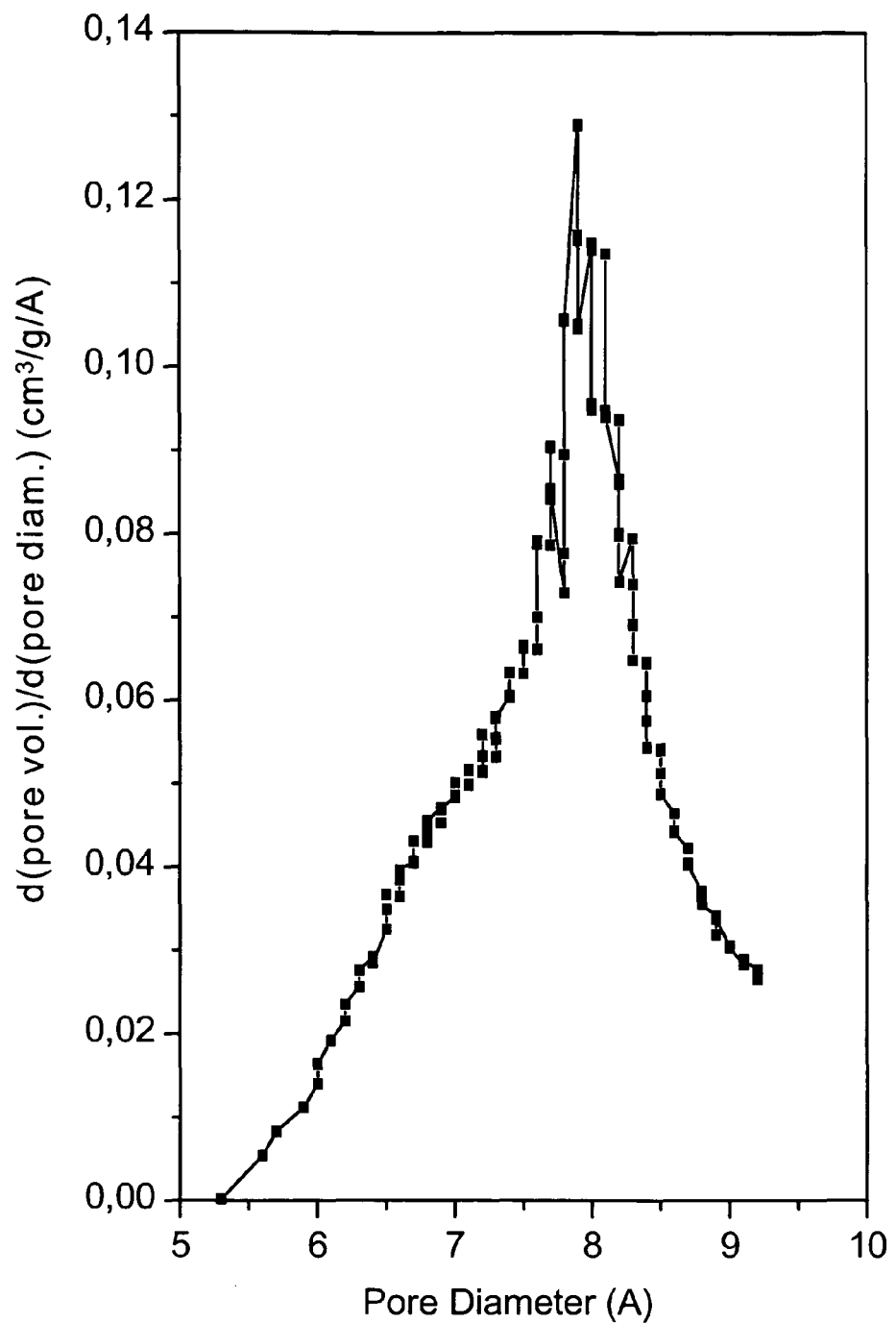
FIG. 1. Pore diameter of the microporous crystalline solid determined from the argon adsorption isotherm obtained at the temperature of liquid argon (85 K) using the Horvath-Kawozoe formalism.

The present invention firstly relates to a catalyst comprising at least:
- one matrix comprising at least one oxide selected from an amorphous oxide, an oxide with low crystallinity, and a mixture of both,
- at least one microporous crystalline solid material which, in the calcined and anhydrous state, has the molar composition $X_2O_3:nYO_2:mZO_2$ in which X is a trivalent element, Y is at least one tetravalent element other than Ge, and Z is Ge, the value (n+m) is at least 5, and may be between 5 and ∞, preferably between 7 and infinity, and the value of n/m is at least 1, and which has, in its calcined and anhydrous state, an X-ray diffractogram containing at least diffraction lines with values of d=13.64, 7.87, 4.82, 4.55, 4.11 and 3.41 Å, and
- at least one hydrogenating component.

In the microporous crystalline solid of the catalyst of the present invention, X is a trivalent element preferably selected from among Al, B, Fe, In, Ga, Cr, and mixtures thereof.

In the microporous crystalline solid of the catalyst of the present invention, Y is preferably a tetravalent element selected from among Si, Ti, Sn, V, and mixtures thereof.

More preferably still, the trivalent element of the microporous crystalline solid is Al.

In a still more preferable embodiment of the crystalline solid forming part of the catalyst, the tetravalent element Y is Si, X is Al and the molar ratio Si/Al of the material is greater than or equal to 7.

In its calcined form, the microporous crystalline solid forming part of the catalyst of the present invention is characterized by having an X-ray diffractogram containing at least diffraction lines with values of d=13.64, 7.87, 4.82, 4.55, 4.11 and 3.41 Å, although, naturally, the exact position and relative intensity of these peaks may depend on factors such as chemical composition and crystal size, among other things.

The crystalline solid material has a molar composition, in the calcined and anhydrous state, expressed by the equation $X_2O_3:nYO_2:mZO_2$ in which X, Y, Z, (n+m) and the value n/m have the meaning given above and it also has, both in its calcined form and when synthesized without calcination, an X-ray diffraction pattern that is different than that of other, known crystalline solid materials, and whose major diffraction lines are given in Table 1 (calcined form) and Table 2 (uncalcined form). It should be borne in mind that the exact position of the diffraction peaks will depend on the chemical composition and crystal size of the material.

TABLE 1

| d(±0.3 Å) | Relative Intensity |
|---|---|
| 13.64 | vs |
| 7.87 | vs |
| 4.82 | w |
| 4.55 | m |
| 4.11 | m |
| 3.41 | m |

TABLE 2

| d(±0.3 Å) | Relative Intensity |
|---|---|
| 13.77 | vs |
| 7.96 | m |
| 4.88 | m |
| 4.60 | s |
| 4.16 | m |
| 3.45 | s |

These diffractograms were obtained with a Philips X'Pert diffractometer equipped with a graphite monochromator and an automatic divergence slit using copper Kα radiation. The diffraction data were recorded with a 2θ step size of 0.01°, in which θ is the Bragg angle, and a count time of 10 seconds per step. The interplanar spacing, d, was calculated in Angström and the relative intensity of the lines was calculated as a percentage of the most intense peak, with 80-100 being considered very strong (vs), 60-80 strong (s)., 40-60 medium (m), 20-40 weak (w), and 0-20 very weak (vw).

It should be borne in mind that the diffraction data printed out for this sample as simple or single lines can be formed by multiple overlaps or superposition of reflections that, in certain conditions, such as in the event of differences in crystallographic changes, may appear as resolved or partially resolved lines. Generally, crystallographic changes can include slight variations in the unit cell parameters and/or changes in crystal symmetry, without this causing a change in the connectivity between the atoms of the structure. These changes, which also include changes in relative intensities, can also be due to differences in the type and quantity of balancing cations, network composition, crystal size and shape, preferred orientation, or to the type of thermal or hydrothermal heat treatments applied.

In its calcined form, the microporous crystalline solid has a pore volume of 0.24 cm$^3$/g. This value would indicate that it probably has a three-dimensional pore structure (which is very suitable as regards the diffusion of reagents and products) with pores of a diameter greater than 0.72 nm, as ascertained by Ar adsorption, carried out at the temperature of liquid argon (85 K), employing the Horvath-Kawazoe method (Horvath, G., Kawazoe, K., J. Chem. Eng. Jpn., 1983, 16, 470). FIG. 1 shows the pore diameter of the microporous crystalline solid determined according to the conditions stated.

The microporous crystalline solid can be subjected to calcination in the presence of steam, at temperatures of between 200 and 800° C., for a time of between 10 minutes and 10 hours.

The catalyst that is the subject of the present invention is a bifunctional catalyst containing at least one hydrogenating component and a substrate formed of a matrix and a crystalline acidic solid material.

The hydrogenating component is preferably selected from at least one noble metal out of Pt, Pd, Ir, Rh, Ru and Re. More preferably still, the noble metal is Pt, Pd, or a combination of both.

The hydrogenating component is preferably present in a proportion of between 0.05 and 10% of the total weight of the catalyst. More preferably the hydrogenating component is present in a proportion of between 0.1 and 10% of the total weight of the catalyst, and even more preferably it is present in a proportion of between 0.25 and 2% by weight of the total weight of the catalyst.

The matrix forming part of the catalyst can consist of at least one amorphous solid, or of at least one solid with low crystallinity, or of mixtures of both.

Preferably, the matrix is selected from among one or more of the following groups: alumina, silica-alumina, silica, clays, magnesium oxide, titanium oxide, boron oxide, zirconium oxide, aluminum phosphates, zirconium phosphates, carbon, and aluminates.

The matrix is preferably present in the catalyst according to the present invention in a proportion of between 1 and 99% by weight of the total weight of the catalyst.

The present invention also relates to a process for the preparation of a catalyst as defined above, which comprises at least:

1) a first step of preparing the microporous crystalline solid as defined above, and a second step selected from among:

2a) mixing of the matrix with the microporous crystalline solid, and incorporation of the hydrogenating component into the mixture, 2b) incorporation of the hydrogenating component directly into the microporous crystalline solid and subsequent mixing of the already-impregnated microporous crystalline solid with the matrix, and 2c) incorporation of the hydrogenating component directly into the matrix and subsequent mixing of the already-impregnated matrix with the microporous crystalline solid.

In the first step in the process for preparing the catalyst, the crystalline solid material is synthesized. The crystalline solid material can be prepared from a reaction mixture containing $H_2O$, optionally an oxide or another source of at least one trivalent element X, such as Al and/or B for example, an oxide or another source of the tetravalent element or elements Y, such as Si for example, a source of Ge, Z, such as $GeO_2$ for example, and an organic structure directing agent (R), generally N(16)-methylsparteinium hydroxide.

The synthesis of said crystalline solid material can comprise the use of fluorides, more specifically HF, or $OH^-$ groups as mobilizing agents for the silica and germanium oxide, and as organic structure directing agents, with organic molecules and fluoride ions being occluded within the structure, which can be removed by conventional means. Thus, the organic component can be removed, for example by extraction and/or by heat treatment with heating to a temperature above 250° C. for a time of between 2 minutes and 25 hours.

In order to generate acid centers that are active in the naphthene-ring-opening reactions, the crystalline solid material is preferably synthesized in the presence of an oxide or another source of a trivalent element, such as B and/or Al, preferably Al.

The reaction mixture has the following composition in terms of oxide molar ratios:

| Reagents | Useable |
|---|---|
| $(YO_2 + ZO_2)/X_2O_3$ | greater than 5 |
| $H_2O/(YO_2 + ZO_2)$ | 1–50 |
| $R/(YO_2 + ZO_2)$ | 0.1–3.0 |
| $F/(YO_2 + ZO_2)$ | 0.1–3.0 |
| $YO_2/ZO_2$ | greater than 1 |

The crystalline solid material can be crystallized with or without stirring, in autoclaves at a temperature of between 80 and 200° C., for times sufficient to obtain crystallization, for example between 12 hours and 30 days.

It should be borne in mind that the components of the synthesis mixture can come from various sources and, depending on these components, the crystallization times and conditions can vary. To facilitate synthesis of the microporous crystalline solid, crystals of the previously synthesized material can be added to the synthesis mixture as seeds, in quantities of up to 15% by weight of the total weight of oxides. These seeds can be added before or during the crystallization of the material.

At the end of the crystallization step, the microporous crystalline solid crystals are separated from the mother liquors and recovered.

The balancing cations in the material in uncalcined form, or following heat treatment, can be exchanged, if they are present, with other cations such as metal ions, $H^+$ and $H^+$ precursors, such as $NH^+_4$, for example. Among the cations that can be introduced by ion exchange, preference is given to those that can play a positive role in the activity of the material as a catalyst, and more specifically cations such as $H^+$, cations of rare earths and Group VIII metals, and metals of Groups IIA, IIIA, IVA, VA, IB, IIB, IIIB, IVB, VB and VIIB of the Periodic Table of the Elements.

The preferred form of the crystalline solid material for its application as acid component of the bifunctional catalyst of the present invention is the protonic (acid) form. The trivalent element is preferably aluminum. The Si/Al ratio of the crystalline solid material is preferably greater than or equal to 7.

Optionally, the crystalline solid material can be subjected to calcination in the presence of steam and/or a mixture of steam and air or any of its components, at temperatures of between 200 and 800° C., preferably between 500 and 750° C., for a time of between 10 minutes and 10 hours, preferably between 30 minutes and 5 hours.

According to the process for preparing the catalyst, the microporous crystalline solid is mixed with a matrix of at least one amorphous inorganic oxide or oxide of low crystallinity, either after having incorporated the hydrogenating component directly into the matrix or after having incorporated the hydrogenating component directly into the microporous crystalline solid, or the hydrogenating component is incorporated into the mixture of both. Said amorphous solid or solid of low crystallinity can be, for example, silica, alumina, or silica-alumina, with no possibility of these examples being considered as limiting the scope of the present invention. The amount of matrix in the catalyst can vary between 1 and 99% by weight of the total weight of the catalyst, more typically between 20 and 80% by weight.

According to the second step in the process for preparing the catalyst of the present invention, the hydrogenating component can be incorporated into said catalyst in various forms. In a preferred embodiment, the hydrogenating component is incorporated directly into the microporous crystalline solid. In another preferred embodiment, the hydrogenating component is incorporated directly into the matrix. In another preferred embodiment, the hydrogenating component is incorporated into the mixture of the microporous crystalline solid and the matrix.

The hydrogenating component can be incorporated into the catalyst by any of the methods well known to those skilled in the art, such as impregnation or ion exchange for example. The hydrogenating component is preferably incorporated by impregnation. The hydrogenation component can be impregnated by means of the pore volume method, also known as "dry" impregnation, in which the volume of the pores of the solid to be impregnated (which may be the matrix, the microporous crystalline solid or a mixture of the matrix and the microporous crystalline solid) is filled with a solution containing at least one precursor of at least one of the noble metals selected from among Pt, Pd, Ru, Ir, Rh and Re. The impregnation can also be carried out with an excess of a solution containing at least one precursor of at least one of the noble metals selected from among Pt, Pd, Ru, Ir, Rh and Re. in this case, the excess of solvent is removed slowly by evaporation under controlled conditions.

The hydrogenating component can be impregnated directly into the microporous crystalline solid, into the matrix, or into a mixture of the microporous crystalline solid and the matrix.

As precursors of the metals, various salts or cationic, anionic or neutral complexes can be used. For example, and without this imposing a limitation on the scope of this invention, in the case of noble metals such as Pt platinum chloride, chloroplatinic acid or various amine complexes of Pt, such as $Pt(NH_3)_4^{2+}$, can be used. Suitable precursors of Pd, without these imposing a limitation, are palladium chloride and the cationic complex $Pd(NH_3)_4^{2+}$.

Following the incorporation of the hydrogenating component, the catalyst can optionally be subjected to a final calcination step, at a temperature of between 150° C. and 800° C.

The amount of hydrogenating component in the catalyst of the present invention can be between 0.05 and 10% by weight, preferably between 0.1 and 5%, and more preferably between 0.25 and 2% by weight.

Before the catalyst is brought into contact with the feed to be treated, it can optionally be subjected to a reduction step after the final calcination. This reduction step can be carried out by bringing the catalyst into contact with a stream of gas containing hydrogen at temperatures between 100° C. and 600° C., preferably from 300 to 500° C., for a time of 10 minutes to 5 hours, preferably 30 minutes to 3 hours. The main aim of this reduction step is to convert the oxide form of the noble metal into its meal form, maintaining a good distribution of the metal over the support.

The present invention also relates to the use of a catalyst as defined above in a process for improving the quality of hydrocarbon fractions in the diesel range, which process comprises a step selected from among a step of hydrogenation of aromatics, a step of opening the naphthene rings, and a combined hydrogenation/naphthene-ring-opening step. Said naphthene species are present in the feed and/or are formed during hydrogenation.

The composition of the diesel fractions to be treated can vary depending on the original refinery process via which they have been obtained. Generally, these fractions mostly contain a mixture of cyclic hydrocarbons (aromatics and naphthenes) and paraffins in a range of boiling points of between approximately 170 and 390° C., in which at least 25% by weight of the hydrocarbons has a boiling point of between 250 and 390° C. Preferably, the hydrocarbon feed to be treated is a hydrotreated fuel oil, since this kind of feed has a low sulfur and nitrogen content, which has a favorable effect on the life of the catalyst of the present invention.

In this process for improving diesel quality, the hydrocarbon fraction to be treated is brought into contact with the catalyst in the presence of hydrogen at a temperature of between 150 and 400° C., preferably at a temperature of between 250 and 380° C., and at a space velocity (LHSV) of between 0.01 $h^{-1}$ and 10 $h^{-1}$, preferably between 0.2 $h^{-1}$ and 5 $h^{-1}$, and more preferably between 0.5 $h^{-1}$ and 2 $h^{-1}$. The hydrogen partial pressure to be used in the process is generally between $10 \times 10^5$ Pa and $150 \times 10^5$ Pa, preferably between $20 \times 10^5$ Pa and $100 \times 10^5$ Pa. The reaction conditions of the present process (temperature, hydrogen pressure and space velocity) will be determined by the composition of the hydrocarbon feed to be treated, and will be chosen so as to achieve maximum hydrogenation of the aromatics present in said feed and maximum opening of the naphthene rings of the naphthene species present in the feed and/or formed during hydrogenation with a minimum loss of product owing to excessive cracking, which will improve the quality of the diesel fraction, a product with a higher cetane index (and number) than the feed being obtained.

As illustrated by the examples described below, the bifunctional catalyst of the present invention has high activity and selectivity for the hydrogenation of aromatics and the opening of the ring of the naphthenes formed and/or present in the feed.

The microporous crystalline solid material forming part of the present catalyst also offers the advantage that it has greater pore dimensions than zeolite Beta and that it can be synthesized directly with the appropriate Si/Al ratio without the need for post-synthesis dealumination processes.

EXAMPLES

The invention is illustrated below with some specific examples, with no possibility of these being considered to limit said invention.

Example 1

This example illustrates a typical process for synthesizing the microporous crystalline solid material containing aluminum in the network (hereinafter Al—SC) in accordance with the invention.

0.86 g of aluminum isopropoxide and 0.53 g of $GeO_2$ were dissolved in 34.42 g of N(16)-methylsparteinium hydroxide solution at a concentration of 1.53 mol/kg. 4.74 g of tetraethyl orthosilicate were hydrolyzed in the solution obtained, and stirring was maintained, allowing all the alcohol formed during hydrolysis to evaporate. 0.52 g of hydrofluoric acid solution (48.1% HF by weight) was then added. The final composition of the synthesis gel was:

$0.95SiO_2:0.05GeO_2:0.02Al_2O_3:0.50ROH:0.50HF:2H_2O$ in which ROH is N(16)-methylsparteinium hydroxide.

The gel was heated at 175° C. for 5 days in steel autoclaves with a Teflon internal lining. After washing with distilled water and drying at 100° C., the Al—SC material was obtained. The Al—SC material was then subjected to a calcination step at 500° C. for 5 hours.

The chemical composition of the calcined Al—SC material synthesized by this process, expressed as % by weight of the respective oxides, was as follows:

3.4% $Al_2O_3$
90.6% SiO2
6.0% $GeO_2$

Example 2

This example illustrates the preparation of a catalyst according to the invention containing the microporous crystalline acidic solid Al—SC obtained according to the process described in Example 1, a gamma-alumina matrix, and platinum as hydrogenating component, in which the hydrogenating component was impregnated into the gamma-alumina matrix.

First, the gamma-alumina matrix was impregnated via the pore volume or "dry" impregnation method with 0.1N aqueous HCl solution containing the required amount of chloroplatinic acid. The solid obtained was dried in an oven at 100° C. for 12 hours and then calcined in a crucible furnace at 500° C. for 3 hours.

The gamma-alumina matrix containing platinum was then mixed with the Al—SC material in the appropriate proportions for obtaining a catalyst with the following chemical composition, expressed as % by weight:
 0.6% platinum (as oxide)
 49.4% γ-alumina
 50.0% Al—SC
This catalyst shall be called $Pt/Al_2O_3$+Al—SC.

Example 3

This example illustrates the preparation of a catalyst in accordance with the invention in which the microporous crystalline acidic solid Al—SC was subjected to calcination in the presence of steam.

First, the microporous crystalline solid Al—SC obtained according to the process described in Example 1 was subjected to calcination in the presence of steam (100% steam) at a temperature of 700° C. for 3 hours. This material shall be called Al—SC-st.

The Al—SC-st solid was then mixed, in the appropriate proportions, with a gamma-alumina matrix containing platinum, prepared as described in Example 2, to give a catalyst with the following composition, expressed as % by weight:
 0.6% platinum (as oxide)
 49.4% γ-alumina
 50.0% Al—SC-st.
This catalyst shall be called $Pt/Al_2O_3$+Al—SC-st.

Example 4

This example illustrates, by way of comparison, the preparation of a catalyst outside the scope of the present invention containing platinum and a zeolite USY.

First, a commercial zeolite USY (CBV760 from Zeolyst Int., $a_0$=24.25 Å, molar ratio $SiO_2/Al_2O_3$=55) was impregnated via the pore volume or "dry" impregnation method with 0.1N aqueous HCl solution containing the required amount of chloroplatinic acid. The solid was then dried in an oven at 100° C. for 12 hours and then calcined in a crucible furnace at 500° C. for 3 hours.

The Pt/USY catalyst obtained contained 1% by weight of Pt, as determined by chemical analysis. This catalyst shall be called Pt/USY.

Example 5

This example illustrates, by way of comparison, the preparation of a catalyst outside the scope of the present invention containing platinum, zeolite USY and a gamma-alumina matrix.

First, the gamma-alumina matrix was impregnated via the pore volume or "dry" impregnation method with 0.1N aqueous HCl solution containing the required amount of chloroplatinic acid. The solid obtained was dried in an oven at 100° C. for 12 hours and then calcined in a crucible furnace at 500° C. for 3 hours.

The gamma-alumina matrix containing platinum was then mixed with a commercial zeolite USY (CBV760 from Zeolyst Int., $a_0$=24.25 Å, molar ratio $SiO_2/Al_2O_3$=55) in the appropriate proportions to give a catalyst with the following chemical composition, expressed as % by weight:
 0.6% platinum (as oxide)
 49.4% γ-alumina
 50.0% zeolite USY.
This catalyst shall be called $Pt/Al_2O_3$+USY.

Example 6

This example compares the activity of the various catalysts prepared according to Examples 2 to 5 for the hydrogenation of aromatics and the opening of naphthene rings.

The catalytic experiments were carried out using a model feed composed of tetralin (aromatic with 10 carbon atoms) diluted in 50% cyclohexane by weight in a continuous fixed bed reactor at temperatures of between 250 and 375° C., at a total pressure of $30 \times 10^5$ Pa, a molar $H_2$/tetralin ratio of 10 and a space velocity (WHSV) of between 2.5 and 5 grams of feed per gram of catalyst per hour.

The results regarding conversion and yields were determined following a period of stabilization of the catalyst, which was observed generally after 6-8 hours of contact between the feed and the catalyst.

All the catalysts prepared according to Examples 2 to 5 were subjected to a reduction step in the actual reactor with a pure hydrogen stream at a temperature of 450° C. for 2 hours before coming into contact with the feed.

Under the above-mentioned reaction conditions, an optimum reaction temperature was found for each catalyst, which gave a maximum yield of products with selective opening (PSOs) of the naphthene ring. Products with selective opening are understood to mean hydrocarbons having the same number of carbon atoms as the starting aromatic but with at least one naphthene ring less. Table 3 shows the hydrogenation conversion of the aromatic and the yields of the various products obtained at the optimum reaction temperature for each catalyst.

TABLE 3

| | Catalyst | | | |
|---|---|---|---|---|
| | $Pt/Al_2O_3$+ Al—SC | $Pt/Al_2O_3$+ Al—SC-st | Pt/USY | $Pt/Al_2O_3$+ USY |
| Temperature (° C.) | 300 | 350 | 325 | 325 |
| WHSV ($h^{-1}$) | 2.5 | 2.5 | 5 | 2.5 |
| Hydrogenation conversion (%) | 99.9 | 99.3 | 98.7 | 99.8 |
| Yields (wt %): | | | | |
| Cracking + dealkylation ($C_1$–$C_9$) | 14.3 | 29.2 | 6.0 | 9.2 |
| Naphthenes $C_{10}$ | 63.4 | 47.6 | 78.5 | 74.6 |
| PSOs | 20.1 | 16.7 | 9.0 | 13.8 |
| Others | 2.1 | 5.8 | 5.2 | 2.2 |

These results show that the catalysts containing the microporous crystalline solid, $Pt/Al_2O_3$+Al—SC and $Pt/Al_2O_3$+Al—SC-st, prepared according to the invention (Examples 2 and 3, respectively) produce a greater yield of products with selective opening (PSOs) of the naphthene ring than the catalysts containing zeolite USY prepared according to Examples 4 and 5, with practically total conversion of the aromatic (tetralin).

Example 7

This example compares the selectivity for the products with selective opening (PSOs) of the naphthene ring of the various catalysts prepared according to Examples 2 to 5.

The catalytic experiments were carried out under the experimental conditions described in Example 6, except that the reaction temperature used in each catalyst was adjusted so as to obtain a constant yield of products with the same number of carbon atoms as the starting aromatic (tetralin, $C_{10}$) and, therefore, so as to be able to compare the selectivity for PSOs of the various catalysts at the same cracking-dealkylation level.

The catalysts prepared according to Examples 2 to 5 were subjected to a reduction step in the actual reactor with a pure hydrogen stream at a temperature of 450° C. for 2 hours before coming into contact with the feed.

Table 4 compares the selectivity for products with selective opening (PSOs) for a yield of $C_{10}$ products of 85% by weight. The selectivity for PSOs (wt %) was calculated as follows:

TABLE 4

$$\text{PSO selectivity (wt \%)} = \frac{\text{PSO yield (wt \%)}}{C_{10} \text{ product yield (wt \%)}} \times 100$$

| | Catalyst | | | |
|---|---|---|---|---|
| | $Pt/Al_2O_3$ +Al—SC | $Pt/Al_2O_3$ +Al—SC-st | Pt/USY | $Pt/Al_2O_3$ +USY |
| $C_{10}$ product yield (wt %) | 85 | 85 | 85 | 85 |
| PSO selectivity (wt %) | 23.8 | 19.5 | 10.1 | 15.0 |

These results clearly show that the catalysts containing the microporous crystalline solid prepared in accordance with the invention are more selective for products with selective opening (PSOs) than catalysts based on zeolite USY.

The invention claimed is:

1. A catalyst comprising at least: one matrix comprising at least one oxide selected from an amorphous oxide, an oxide with low crystallinity, and a mixture of both, at least one microporous crystalline solid material which, in the calcined and anhydrous state, has the molar composition $X_2O_3$:$nYO_2$: $mZO_2$ in which X is a trivalent element, Y is at least one tetravalent element other than Ge, and Z is Ge, the value (n+m) is at least 5, and may be between 5 and infinity, and the value of n/m is at least 1, and which has, in its calcined and anhydrous state, an X-ray diffractogram containing at least diffraction lines with values of d=13.64, 7.87, 4.82, 4.55, 4.11 and 3.41 Å, and at least one hydrogenating component.

2. The catalyst as claimed in claim 1, wherein X is a trivalent element selected from among Al, B, Fe, In, Ga, Cr, and mixtures thereof, and, Y is a tetravalent element selected from among Si, Ti, Sn, V, and mixtures thereof.

3. The catalyst as claimed in claim 1, wherein the trivalent element is Al.

4. The catalyst as claimed in claim 1, wherein the tetravalent element is Si, X is Al and the molar ratio Si/Al of the microporous crystalline solid material is greater than or equal to 7.

5. The catalyst as claimed in claim 1, wherein the microporous crystalline solid is subjected to calcination in the presence of steam, at temperatures of between 200 and 800° C., for a time of between 10 minutes and 10 hours.

6. The catalyst as claimed in claim 1, which comprises a hydrogenating component selected from, at least one noble metal out of Pt, Pd, Ir, Rh, Ru and Re.

7. The catalyst as claimed in claim 6, wherein the noble metal is Pt, Pd, or a combination of both.

8. The catalyst as claimed in 1, wherein the hydrogenating component is present in a proportion of between 0.05 and 10% of the total weight of the catalyst.

9. The catalyst as claimed in claim 1, wherein the hydrogenating component is present in a proportion of between 0.1 and 5% of the total weight of the catalyst.

10. The catalyst as claimed in claim 1, wherein the hydrogenating component is present in a proportion of between 0.25 and 2% of the total weight of the catalyst.

11. The catalyst as claimed in claim 1, wherein the matrix is present in a proportion of between 1 and 99% by weight of the total weight of the catalyst.

12. The catalyst as claimed in claim 1, wherein the matrix is selected from among one or more of the following groups: alumina, silica-alumina, silica, clays, magnesium oxide, titanium oxide, boron oxide, zirconium oxide, aluminum phosphates, zirconium phosphates, carbon, and aluminates.

13. A process for the preparation of a catalyst as claimed in claim 1, which comprises at least:
   1) a first step of preparing the microporous crystalline solid, and a second step selected from among:
   2a) mixing of the matrix with the microporous crystalline solid, and incorporation of the hydrogenating component into the mixture,
   2b) incorporation of the hydrogenating component directly into the microporous crystalline solid and subsequent mixing of the already-impregnated microporous crystalline solid with the matrix, and
   2c) incorporation of the hydrogenating component directly into the matrix and subsequent mixing of the already-impregnated matrix with the microporous crystalline solid.

14. The catalyst preparation process as claimed in claim 13, wherein the hydrogenating component is incorporated directly into the microporous crystalline solid.

15. The catalyst preparation process as claimed in claim 13, wherein the hydrogenating component is incorporated directly into the matrix.

16. The catalyst preparation process as claimed in claim 13, wherein the hydrogenating component is incorporated into the mixture of the microporous crystalline solid and the matrix.

17. The process as claimed in claim 13, wherein, following the incorporation of the hydrogenating component, the catalyst is subjected to a final calcination step at a temperature of between 150° C. and 800° C.

18. The process as claimed in claim 17, wherein, following the final calcination step, the catalyst is subjected to a reduction step.

19. The process as claimed in claim 18, wherein the reduction step is carried out by bringing the catalyst into contact with a stream of gas containing hydrogen at a temperature of between 100° C. and 600° C. for a time of between 30 minutes and 3 hours.

20. The process as claimed in claim 13, wherein the hydrogenating component is incorporated by means of a step selected from between impregnation and ion exchange.

* * * * *